United States Patent
Schneidmiller et al.

(10) Patent No.: US 8,677,678 B2
(45) Date of Patent: Mar. 25, 2014

(54) FLYING INSECT TRAP WITH ATTRACTANT PORTS

(75) Inventors: Rodney G. Schneidmiller, Greenacres, WA (US); Qing-He Zhang, Spokane Valley, WA (US)

(73) Assignee: Sterling International Inc., Spokane, WA (US)

( * ) Notice: Subject to any disclaimer, the term of this patent is extended or adjusted under 35 U.S.C. 154(b) by 272 days.

(21) Appl. No.: 13/405,047

(22) Filed: Feb. 24, 2012

(65) Prior Publication Data

US 2012/0151822 A1   Jun. 21, 2012

Related U.S. Application Data

(63) Continuation-in-part of application No. 12/959,272, filed on Dec. 2, 2010, now Pat. No. 8,484,887, which is a continuation-in-part of application No. 12/350,911, filed on Jan. 8, 2009, now Pat. No. 8,056,282, which is a continuation-in-part of application No. 12/200,820, filed on Aug. 28, 2008, now Pat. No. 8,051,600.

(60) Provisional application No. 61/446,933, filed on Feb. 25, 2011, provisional application No. 61/013,936, filed on Dec. 14, 2007, provisional application No. 61/286,318, filed on Dec. 14, 2009.

(51) Int. Cl.
  *A01M 7/00*   (2006.01)
(52) U.S. Cl.
  USPC .......................................................... 43/122
(58) Field of Classification Search
  USPC .................................................. 43/122, 107
  See application file for complete search history.

(56) References Cited

U.S. PATENT DOCUMENTS

| 38,277 A | 4/1863 | Basett |
| 149,918 A | 4/1874 | Clough |
| 218,175 A | 8/1879 | Hollingshead |

(Continued)

FOREIGN PATENT DOCUMENTS

| JP | 08-322448 A | 12/1996 |
| JP | 09-252700 A | 9/1997 |

OTHER PUBLICATIONS

Extended European Search Report mailed Feb. 7, 2011, issued in corresponding European Application No. EP08798913.3, filed Aug. 28, 2008, 5 pages.

(Continued)

*Primary Examiner* — Christopher P Ellis
(74) *Attorney, Agent, or Firm* — Christensen O'Connor Johnson Kindness PLLC (57) ABSTRACT

An insect trap (100) includes an entrapment chamber (110) with an entry structure (140) over one open end. The entry structure includes (i) a lid (142) with a central aperture (144) and one or more peripheral apertures (146); (ii) a tapered guide (150) on one side of the lid, and (iii) a port fixture (160) that extends through the central aperture and engages the tapered guide. The port fixture includes one or more tubular ports (168) that extend through the peripheral apertures, and one or more cartridges (170) that are removably inserted into the tubular ports. The cartridges contain attractant that is exposed to the interior of the attractant chamber when the trap is assembled. The cartridges may be replaced to replenish or replace attractant without removing the entry structure.

22 Claims, 5 Drawing Sheets

(56) References Cited

U.S. PATENT DOCUMENTS

| | | | |
|---|---|---|---|
| 418,233 A | 12/1889 | Sallade | |
| 836,052 A | 11/1906 | Pool | |
| 862,079 A | 7/1907 | Lenthier | |
| 1,131,120 A | 3/1915 | Crawford | |
| 1,277,354 A | 9/1918 | Arabian | |
| 1,544,334 A | 5/1923 | Martin | |
| 3,059,373 A | 10/1962 | Gardner | |
| 3,320,692 A | 5/1967 | Hellen | |
| 3,885,341 A | 5/1975 | Kuchenbecker | |
| 4,044,494 A | 8/1977 | Grajnert | |
| 4,551,941 A | 11/1985 | Schneidmiller | |
| 4,873,787 A | 10/1989 | Schneidmiller | |
| 4,876,822 A | 10/1989 | White | |
| 5,231,792 A * | 8/1993 | Warner | 43/122 |
| 5,522,171 A | 6/1996 | Mandeville | |
| 5,557,880 A | 9/1996 | Schneidmiller | |
| 6,158,165 A | 12/2000 | Wilson | |
| 6,289,629 B2 | 9/2001 | Greening | |
| 6,910,298 B2 | 6/2005 | Schneidmiller | |
| 7,093,389 B1 * | 8/2006 | Meier et al. | 43/107 |
| 7,100,324 B2 | 9/2006 | Lenker | |
| 7,412,797 B1 | 8/2008 | Hiscox | |
| 7,886,481 B2 * | 2/2011 | Schneidmiller et al. | 43/122 |
| 8,028,467 B2 * | 10/2011 | Bagnall et al. | 43/113 |
| 8,448,376 B2 * | 5/2013 | Kagawa | 43/107 |
| 2005/0028429 A1 | 2/2005 | Schneidmiller | |
| 2005/0028430 A1 | 2/2005 | Schneidmiller | |
| 2005/0102888 A1 | 5/2005 | Curnow | |
| 2007/0011940 A1 | 1/2007 | Chen | |
| 2007/0151142 A1 | 7/2007 | Suteerawanit | |
| 2009/0151227 A1 | 6/2009 | Schneidmiller | |
| 2009/0151228 A1 | 6/2009 | Schneidmiller | |
| 2011/0067293 A1 | 3/2011 | Schneidmiller | |

OTHER PUBLICATIONS

International Search Report and Written Opinion mailed Mar. 13, 2009, issued in corresponding International Application No. PCT/US2008/074690, filed Aug. 28, 2008, 7 pages.

International Preliminary Report on Patentability mailed Jul. 5, 2011, issued in corresponding International Application No. PCT/US2009/030092, filed Jan. 5, 2009, 3 pages.

International Search Report and Written Opinion mailed Aug. 29, 2011, issued in corresponding International Application No. PCT/US2010/060149, filed Dec. 13, 2010, 7 pages.

International Search Report and Written Opinion mailed Sep. 25, 2012, issued in corresponding International Application No. PCT/US2012/026603, filed Feb. 24, 2012, 7 pages.

* cited by examiner

FLYING INSECT TRAP WITH ATTRACTANT PORTS

CROSS-REFERENCES TO RELATED APPLICATIONS

This application claims the benefit of Provisional Application No. 61/446,933, filed Feb. 25, 2011, and is a continuation-in-part of U.S. patent application Ser. No. 12/959,272, filed Dec. 2, 2010, which is a continuation-in-part of application Ser. No. 12/350,911, filed Jan. 8, 2009, now U.S. Pat. No. 8,056,282, which is a continuation-in-part of application Ser. No. 12/200,820, filed Aug. 28, 2008, now U.S. Pat. No. 8,051,600, which claims the benefit of Provisional Application No. 61/013,936, filed Dec. 14, 2007. U.S. patent application Ser. No. 12/959,272 further claims the benefit of Provisional Application No. 61/286,318, filed Dec. 14, 2009. The entire disclosures of the aforementioned applications are hereby expressly incorporated by reference herein.

BACKGROUND

Flying insects, for example, various social wasps, including paper wasps, hornets, and yellow jackets, can be a significant nuisance and a potential hazard to animals and people engaged in outdoor activities. Such flying insects can be prevalent in rural settings and even in very well-developed residential areas. Various species of insects, flying and otherwise, are also common in agricultural settings and in other commercial processing venues, including, for example, meat-packing factories, food-processing facilities, and livestock ranches.

Traps for flying insects are known in the art and often have been quite successful at trapping target insects. For example, an inventor of the insect trap disclosed herein pioneered conical element hanging traps, such as the wasp traps described and claimed in U.S. Pat. No. 4,551,941, which issued on Nov. 12, 1985, to Schneidmiller, and which is hereby incorporated by reference in its entirety. Schneidmiller discloses a transparent, cylindrical insect trap that is selective to entrapping wasps. A "wasp" is a generic name applied to insects of the order Hymenoptera, which includes particularly paper wasps, hornets, and yellow jackets. The present inventor also discloses certain improvements to the insect trap in U.S. Pat. No. 5,557,880, also incorporated herein by reference in its entirety.

Previously patented trap structures include a transparent, generally cylindrical entrapment chamber that is open at the bottom, and a base that attaches to the bottom of the entrapment chamber, and defines one or more entryways for the target insect. In the prior art device, the entrapment chamber also includes ventilation openings at the top end of the cylindrical entrapment chamber. The entryways in the base are apertures that permit and encourage entry into the entrapment chamber by wasps. An entry cone shaped as a truncated cone or tapered guide is disposed in the entrapment chamber. The tapered guide is open at the bottom, which is directly adjacent to the perimeter at the bottom of the entrapment chamber, and includes a smaller open aperture at the top end of the tapered guide. Wasps or other target insects enter the trap through the entryways and fly or climb into the cone, passing through the smaller aperture in its truncated upper end. The target insect thereby becomes entrapped in the cylindrical chamber. Once the target insect is inside the chamber, exiting is highly improbable.

Semiochemical is a generic term to describe chemicals or chemical mixtures that carry messages within or between species of organisms, including, for example, insects. It is believed that most, if not all, insects use semiochemicals to communicate with other individuals of the same species or other species. Examples of semiochemicals include pheromones, allomones, kairomones, synomones, attractants, and repellants. The present application discusses the use of attractants in insect traps, for ease in understanding the disclosure. "Attractant" is herein specifically defined to encompass any semiochemical, and is not intended to be restricted to attractants per se.

Insect traps may utilize one or more attractants to lure target insects into the trap. The attractant may be as simple as water, or may be a chemical attractant that is targeted to a particular species. For example, the attractant may be an olfactory attractant for the target insect. In one embodiment, the attractant is a volatile attractant formed into a solid with a polyurethane matrix such that the attractant will evaporate and escape from the matrix over a period of time. The attractant may combine water with a volatile olfactory attractant, wherein the volatile olfactory attractant mixes with vapors from a chemical attractant and/or water in a separate container, the mixed vapors exiting the trap in a plume. An effective attractant plume will attract the target insects toward the trap, and in particular toward the trap entryway. Various attractants or combination of attractants may be used, including both solid and liquid attractants, providing great flexibility in selecting from a range and combination of attractants.

Attractants for luring target insects to the trap are consumable product that must be periodically replenished. Generally, the attractant is formulated to diffuse or evaporate over time such that an attractant plume is generated from the trap for a relatively long period of time. The attractant will, however, eventually be depleted. In prior art traps, replenishing the attractant can be inconvenient. Typically the user must at least partially disassemble the trap, opening the entrapment chamber. This may be inconvenient in the field, particularly if weather conditions are cold and/or rainy. Moreover, when opening the entrapment chamber there is a possibility of releasing one or more target insects that may have only recently become entrapped. The target insect may sting, bite, or otherwise attack the user. The inconvenience associated with changing or replenishing the attractant may cause users to delay replacement of the attractant, and thereby reduce the effectiveness of the trap.

It will also be appreciated that there may be reasons to change or replenish an attractant for reasons other than depletion of the existing attractant. For example, the user may desire to use an alternative attractant, for example, to target a different insect, or an alternative attractant may be desirable due to insect behavioral characteristics. For example, different attractants may be desirable in different temperatures, weather conditions, or the like. It may also be beneficial to combine different attractants in a single trap, and to be able to conveniently change the particular combination of semiochemicals in the trap. For example, if a trap is found to be entrapping an unintended species of insect, in addition to the target species, it may be desirable to add a repellant for the unintended species, while continuing use of the attractant for the target species. Therefore, there is a need for a more convenient mechanism for changing or replacing insect attractant in a trap.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An insect trap in accordance with the present invention includes an entrapment chamber having an open end with an entry structure removably attached thereto. The entry structure includes a lid defining a central entry aperture and a peripheral aperture. For example, the lid may have a plurality of peripheral apertures. A tapered guide, for example a perforated cone, is provided to guide target insects into the trap and to hinder trapped insects from escaping. The entry structure further includes an attractant port fixture that is configured to receive removable cartridges containing attractant or some type of semiochemical. The fixture includes one or more tubular ports that extend through the peripheral apertures, and a panel structure that extends through the entry aperture and engage the tapered guide. Cartridges removably inserted into the ports expose attractant in the cartridges to the interior of the entrapment chamber.

In an embodiment, the fixture includes three tubular ports, and the tubular ports have a distal end defined by a cage-like structure to prevent or inhibit insects from leaving the trap through the tubular ports when the cartridge is removed.

In an embodiment, the fixture includes a cap portion and is movable between a closed position wherein the cap portion overlies the entry aperture, and an open position wherein the cap portion is disposed away from the entry aperture.

In an embodiment, the cartridges include an oversized proximal end cap that fits in a corresponding recess defined in the cap portion, such that the user can readily determine when the cartridge is fully inserted.

In an embodiment, the panel structure divides the entry aperture into a plurality of smaller entryways, and provides a visual shield between the smaller entryways.

In an embodiment, a second entry structure is provided on an opposite open end of the entrapment chamber. The second entry structure may be similar to the first entry structure with removable cartridges, or may be different, for example, defining a plurality of entry apertures with panels disposed between the apertures.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
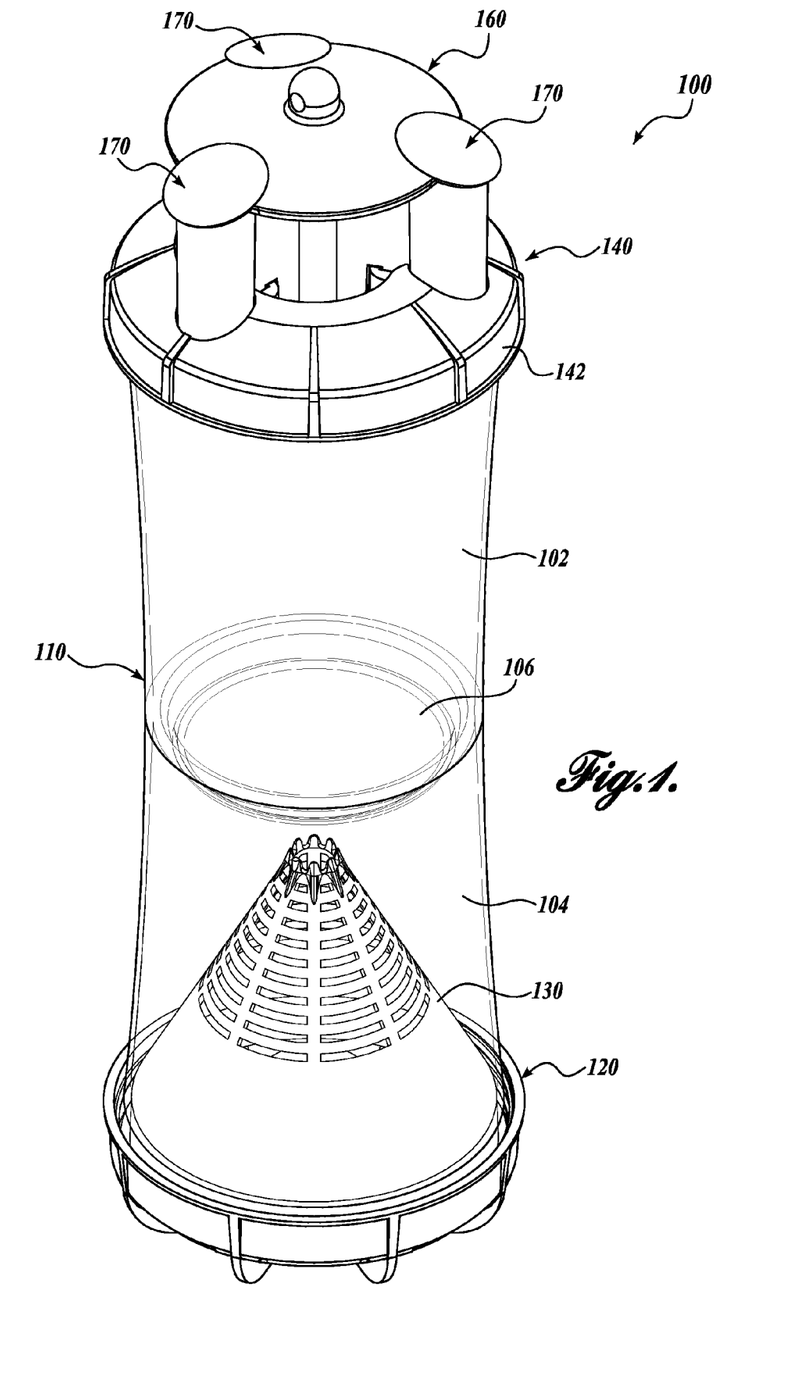
FIG. 1 is a perspective view of a first embodiment of a flying insect trap in accordance with the teachings of the present invention.
Figure 2:
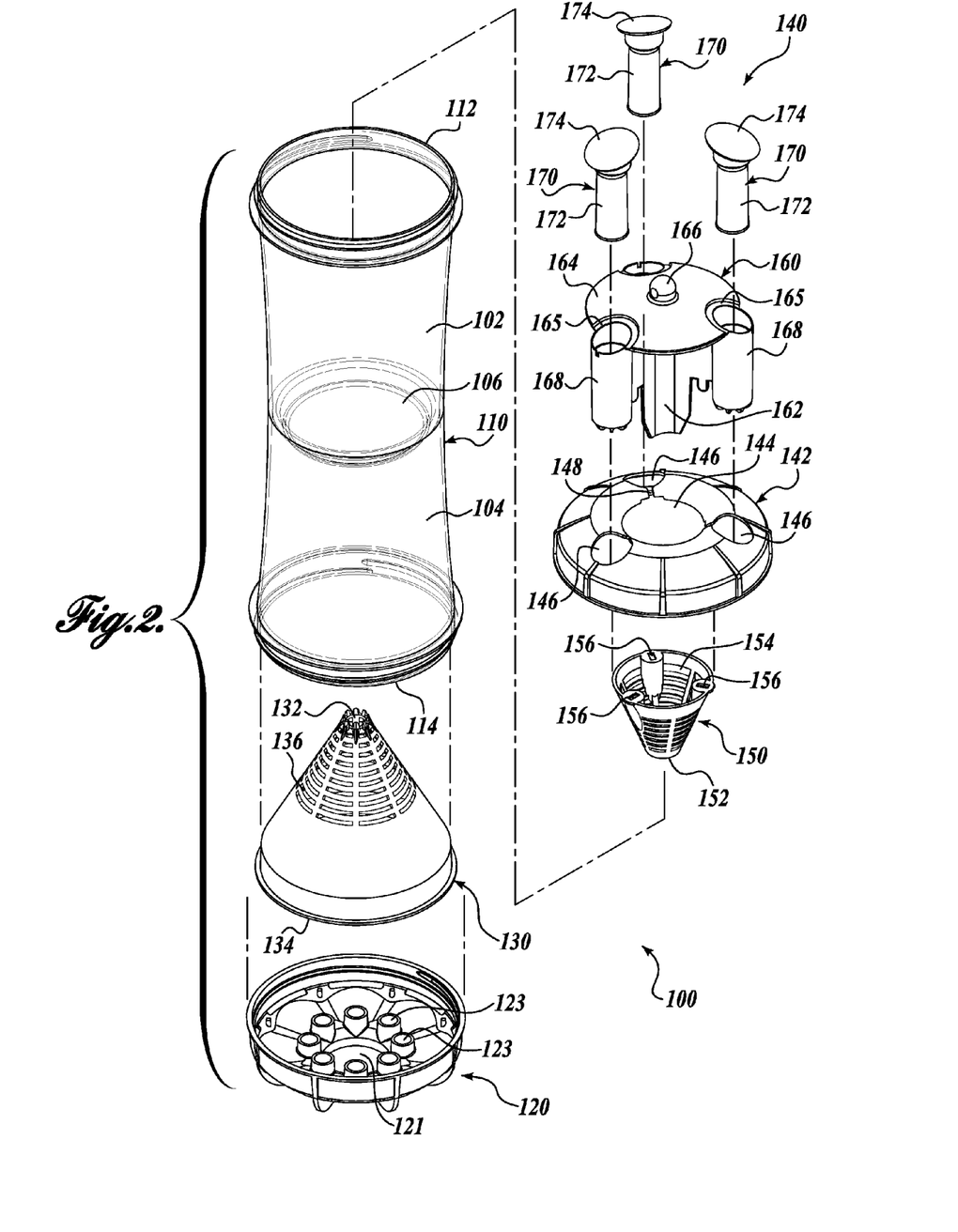
FIG. 2 is an exploded view of the flying insect trap shown in FIG. 1.

Particular embodiments of a trap in accordance with the present invention will now be described with reference to the FIGURES, wherein like numbers indicate like parts. The flying insect trap 100 includes many aspects disclosed in U.S. Patent Publication No. 2009/0151227, to Schneidmiller, issued as U.S. Pat. No. 8,056,282, which is hereby incorporated by reference in its entirety. FIG. 1 is a perspective view of a flying insect trap 100 in accordance with the present invention. FIG. 2 shows an exploded view of the trap 100 shown in FIG. 1.

In this embodiment, the flying insect trap 100 includes an entrapment chamber 110 that defines an upper compartment 102 and a lower compartment 104. The upper and lower compartments 102, 104 are separated by an intermediate internal transverse wall 106. The entrapment chamber 110 is at least partially transparent or translucent and formed from an injection molded polymeric material, although other known manufacturing methods may be used that are well known in the art. The separated compartments 102, 104, although not critical to the present invention, provide greater flexibility in deploying and using the trap 100. In one method of use, the trap 100 is used to attract and trap multiple species of flying insects. With multiple separated compartments 102, 104, fewer traps may be required in applications wherein more than one insect is to be targeted. It is contemplated that the trap may alternatively be provided with more than two separated compartments, for example, by providing a Y-shaped or cruciform entrapment chamber with barriers or other separation means provided between the legs of these alternative entrapment chambers, such as certain traps disclosed in the related U.S. Pat. No. 8,051,600, which is incorporated by reference above.

A lower entry structure 120 is removably attached to a bottom end 114 of the entrapment chamber 110, and an upper entry structure 140 is removably attached to an upper end 112 of the entrapment chamber 110. A large tapered guide 130 extends from the bottom end 114 of the entrapment chamber 110 into the lower compartment 104. The large tapered guide 130 in this embodiment is frustoconical with a larger open end 134 near or adjacent the lower entry structure 120, and a smaller open end 132 extending into the entrapment chamber 110. A plurality of apertures 136 in the tapered guide 130 improve light transmission through the tapered guide 130 and provide a perch for insects to further encourage insects to climb through the tapered guide 130.

The lower entry structure 120 comprises a lid that includes entry apertures 123 that provide insect access into the lower compartment 104 of the entrapment chamber 110. Preferably, a mechanism for retaining an attractant on or near the lower entry structure 120 is also provided. In this embodiment, the retaining mechanism is a recess 121 disposed near the center of the lower entry structure 120.

The upper entry structure 140 comprises a lid 142 that engages the top end 112 of the entrapment chamber 110, for example, by threadable engagement. The lid 142 in this embodiment includes a central aperture 144 and a plurality of peripheral apertures 146 (three shown). A smaller tapered guide 150 is disposed directly below the central aperture 144. The smaller tapered guide 150 in this embodiment is frustoconical with a larger open end 154 disposed near or adjacent the lid 142, and a smaller open end 152 that extends into the upper compartment 102. Attachment portions 156 are defined near the larger open end 154.

Figure 3:
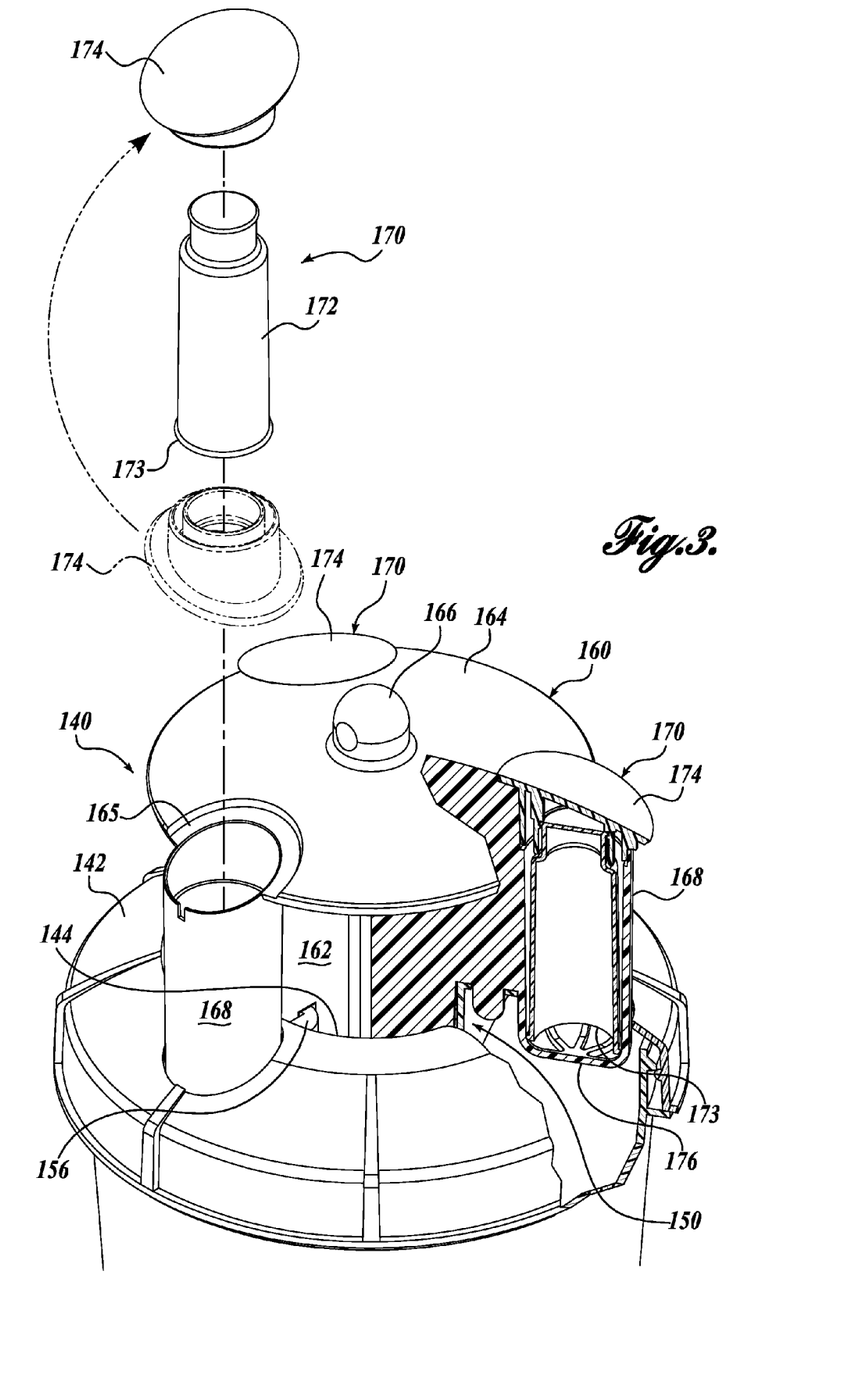
FIG. 3 is a fragmentary detail view showing the upper structure of the flying insect trap shown in FIG. 1.

Refer now also to FIG. 3 which shows a detail, cutaway view of the upper entry structure 140. An attractant port fixture 160 is configured to extend through the lid 142 central aperture 144 and engage the attachment portions 156 of the smaller tapered guide 150. The port fixture 160 includes a panel structure 162 having a distal end that extends through the central aperture 144 and that slidably engages slots 148 in the lid 142. A cap portion 164 is attached to the proximal end of the panel structure 162 and may include a hanging nib 166.

The upper entry structure 140 also defines a plurality of cylindrical ports 168 (three shown). In the present embodiment, the ports 168 are fixedly attached to, or formed integrally with, the cap portion 164 and the panel structure 162. The ports 168 are open at the top, and are sized and positioned to slidably engage the peripheral apertures 146 in the lid 142.

The ports 168 are sized and configured to slidably receive an attractant cartridge 170. The attractant cartridges 170 have a cylindrical body 172 that is configured to receive an insect attractant and is open at the bottom 173. The attractant may be a solid attractant, or otherwise stabilized, for example, by mixing the attractant with a matrix material such as an open-celled polymeric foam, a gel or paste, or the like. The attractant cartridge 170 includes an oversized end cap 174 at an upper end that may be contoured to fit in corresponding recesses 165 in the cap portion 164.

Although not critical to the present invention, in a current embodiment the end cap 174 is removable from the cylindrical body 172, for example with a friction fit, and is further configured to removably snap onto the distal end of the cylindrical body 172 (as indicated in phantom in FIG. 3). The end cap 174 may therefore be used to seal the attractant inside the cylindrical body 172 prior to use.

The oversized end cap 174 may conveniently be contoured to provide an aesthetic benefit, and also provides a lip that extends outwardly to facilitate removal of the cartridge 170. The end caps 174 may also provide a visual indicator to the user to identify when the cartridge 170 is fully inserted (e.g., if the end cap 174 is substantially coplanar with the cap portion 164).

As seen most clearly in FIG. 3, the attractant ports 168 include a cage structure 176 at the distal end. The cage structure 176 prevents insects from entering the ports 168. In particular, when a user removes an attractant cartridge 170 from a corresponding port 168, for example, to insert a new attractant cartridge, any active target insects in the entrapment chamber 110 are prevented by the cage structure 176 from escaping through the temporarily empty port 168. The cage structure 176 can also be used to control the release rates of the attractant contained in the port 168, especially where the attractant comprises one or more highly volatile compounds, by varying the size of the opening slots defined by the cage structure 176 to optimize performance. For example, a screen or semi-porous panel may be disposed at the distal end of the port 168.

Figure 4:
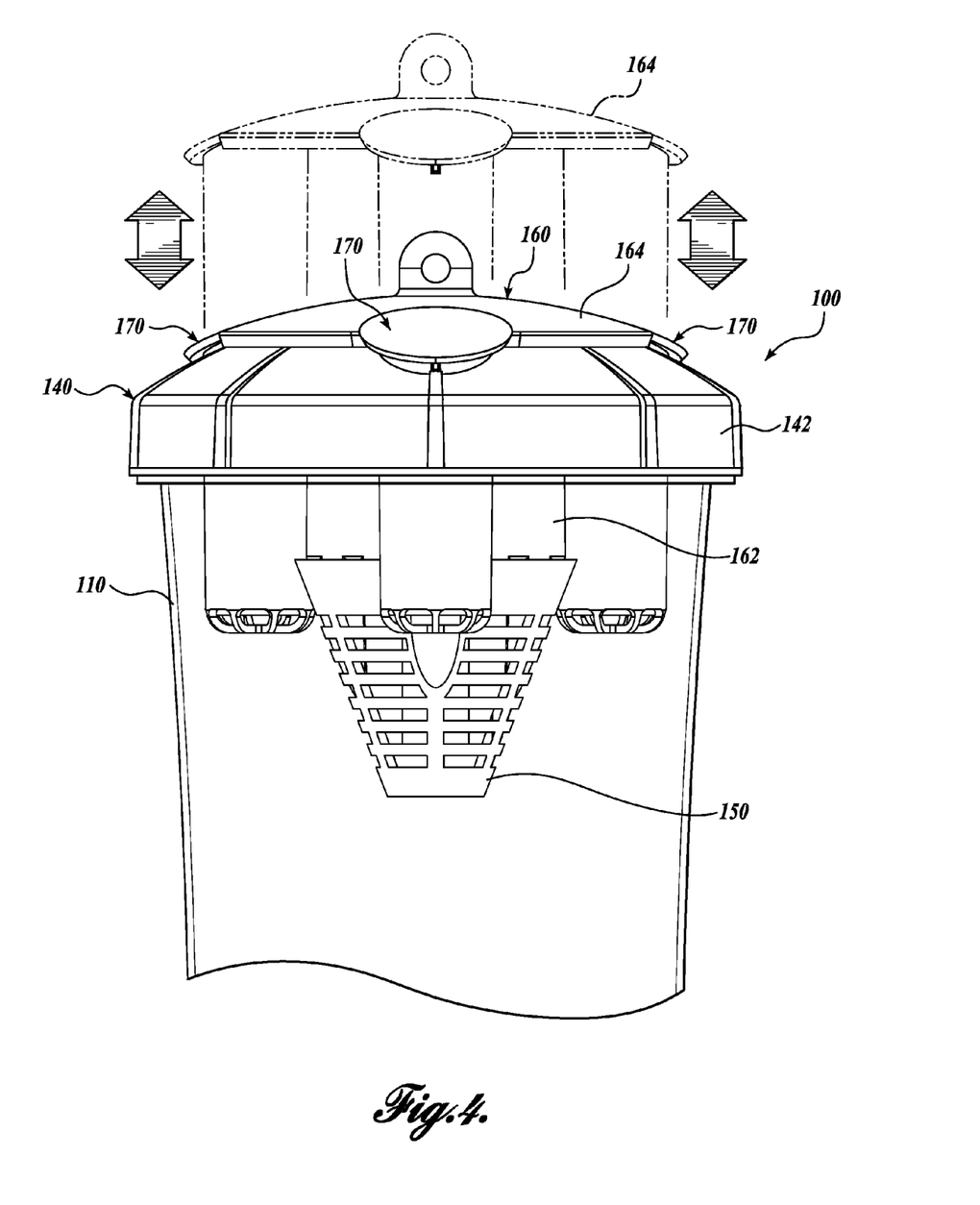
FIG. 4 shows a front view upper portion of the flying insect trap shown in FIG. 1, showing the cap structure moved to the closed position.

In the current embodiments, the cylindrical ports 168 and the panel structure 162 are substantially parallel and slidably engage the lid 142, such that the attractant port fixture 160 may be slidably moved between an open position shown in FIGS. 1 and 3 wherein the smaller tapered guide 150 is substantially adjacent the lid 142, and a closed position shown in FIG. 4 wherein the cap portion 164 of the attractant port fixture 160 is substantially adjacent the lid 142. In the open position, the central aperture 144 and the panel structure 162 cooperatively define a plurality of smaller entryways for target insects into the upper compartment 102 of the entrapment chamber 110 through the smaller tapered guide 150. It will be appreciated that the smaller entryways are visually blocked or shielded from each other by the panel structure 162. Therefore, a target insect at an entryway on one side of the panel structure 162 will not be deterred from approaching and entering the trap by a target insect positioned near a different one of the smaller entryways.

The attractant in the attractant cartridges 170 will typically diffuse or evaporate gradually into the upper compartment 102 through the cage structure 176 of the attractant ports 168. The outlet of the attractant ports 168 is located radially outwardly from the smaller tapered guide 150. The target insects will therefore be further attracted to continue through the smaller tapered guide 150 and through the smaller open end 152. It is unlikely that the insect will reenter the smaller tapered guide 150 because of the small size of the smaller open end 152.

To use the trap 100, a user may position the trap 100 in any desired location. For example, a line such as a string, wire, or the like may be attached to the hanging nib 166 to hang the trap 100 from a tree limb, roof eave, hanging fixture, etc. Attractant cartridges 170 in the trap 100 may be periodically replaced. Moreover, it is contemplated that different attractants may be available. For example, one attractant may be particularly effective early in the season for attracting a target insect, and a second attractant may be more effective later in the season either due to seasonal behavioral changes in the target insect or to attract a different species of insect.

In particular, the attractant may be replenished while insects are active within the trap 100, without the trapped insects escaping the trap 100, so that there is little likelihood of the user being stung or otherwise threatened by trapped insects.

The current embodiment is disclosed with an entrapment chamber 110 that defines two separate compartments 102, 104. This provides certain advantages, for example, to optimize the efficiency of the trap 100 and to allow for targeting of multiple species of insects. For example, it has been found effective in some applications to partially fill the upper compartment 102 with water and/or a water-based attractant while providing a solid attractant (or a liquid attractant on a solid substrate) in the lower compartment 104. However, the teachings of the present invention may be readily applied to insect traps wherein the entrapment chamber is not divided into separate compartments. Conversely, it is contemplated that the entrapment chamber may be divided into more than one compartment. It is also readily applicable to such traps having only a single entryway into the entrapment chamber.

Also, although the current embodiment shows the attractant port fixture 160 on only the top end of the trap 100, it is contemplated that the attractant port fixture 160 may be placed on either end of the entrapment chamber 110, and it will be readily appreciated by persons of skill in the art that suitable attractant port fixtures 160 may be provided at both the top and the bottom end of the entrapment chamber 110.

Figure 5:
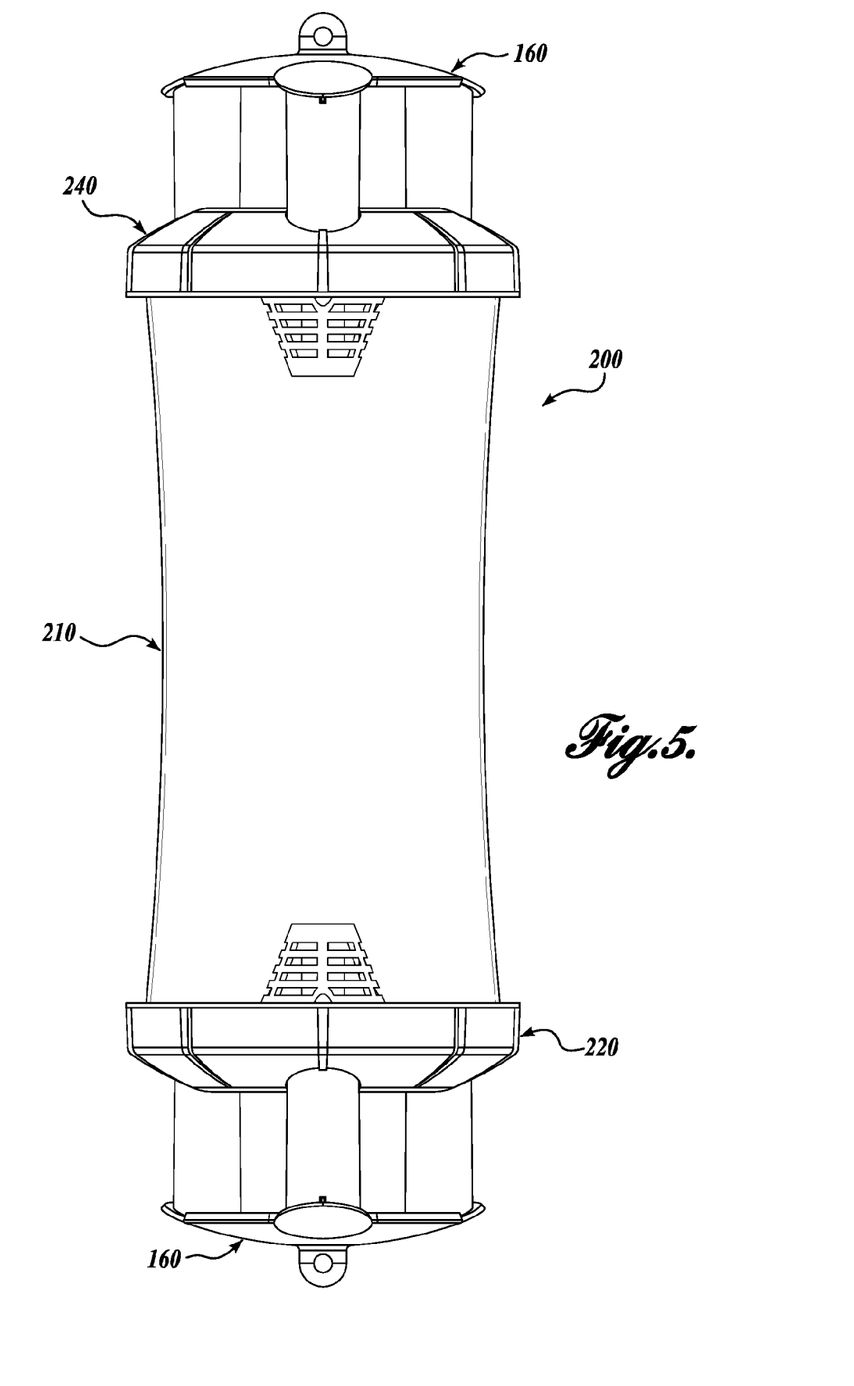
FIG. 5 shows a front view of another embodiment of a flying insect trap in accordance with the present invention, having an entrapment chamber with a single compartment.

For example, FIG. 5 illustrates a second embodiment of an insect trap 200 in accordance with the present invention. The trap 200 is similar to the trap 100 described above. However, in this embodiment the entrapment chamber 210 defines a single compartment. In this example, the lower entry structure 220 and the upper entry structure 240 are both similar to the upper entry structure 140 described above.

While illustrative embodiments have been illustrated and described, it will be appreciated that various changes can be made therein without departing from the spirit and scope of the invention.

The invention claimed is:
1. An insect trap comprising:
an entrapment chamber having an open first end;
a first entry structure comprising (i) a lid attached to the open first end of the entrapment chamber, the lid defining an entry aperture and a peripheral aperture; (ii) a first tapered guide disposed in the entrapment chamber near to the entry aperture; and (iii) an attractant port fixture having a panel structure that extends through the entry aperture and a tubular port that extends through the peripheral aperture; and an attractant cartridge containing an attractant and configured to be slidably inserted into the tubular port to expose the attractant to an interior of the entrapment chamber.

2. The insect trap of claim 1, wherein the lid defines a plurality of peripheral apertures, the attractant port fixture has a plurality of tubular ports that extend through corresponding ones of the plurality of peripheral apertures, and the attractant cartridge comprises a plurality of attractant cartridges that are each configured to be slidably inserted into a corresponding one of the plurality of tubular ports.

3. The insect trap of claim 1, wherein the attractant port fixture further comprises a cap, and further wherein the panel structure has a distal end that is attached to the first tapered guide and a proximal end that attaches to the cap.

4. The insect trap of claim 3, wherein the attractant port fixture is movable between a closed position wherein the cap overlies the entry aperture and an open position wherein the first tapered guide is adjacent the entry aperture.

5. The insect trap of claim 3, wherein the tubular port has a distal end defining a cage structure that is configured to permit attractant to pass therethrough and to prevent target insects in the entrapment chamber from entering the tubular port.

6. The insect trap of claim 3, wherein the attractant cartridge has a proximal end comprising an oversized end cap.

7. The insect trap of claim 6, wherein the oversized end cap is configured to be removably attached to a distal end of the attractant cartridge to retain attractant in the cartridge prior to use in the insect trap.

8. The insect trap of claim 6, wherein the cap defines a recess that is shaped to receive the oversized end cap of the attractant cartridge.

9. The insect trap of claim 1, wherein the panel structure slidably engages the entry aperture such that the entry aperture is partitioned into a plurality of smaller entryways, such that the smaller entryways are visually shielded from each other by the panel structure.

10. The insect trap of claim 1, wherein the entrapment chamber has an open second end, and further comprising a second entry structure that is attached to the open second end.

11. The insect trap of claim 10, wherein the entrapment chamber further comprising an internal transverse wall that divides the entrapment chamber into two separate compartments.

12. The insect trap of claim 10, wherein the second entry structure comprises a second tapered guide disposed in the entrapment chamber.

13. The insect trap of claim 10, wherein the second entry structure comprises a lid having a plurality of spaced-apart entry apertures.

14. An insect trap comprising:

an entrapment chamber having an open upper end;

an entry structure that is removably attached to the open upper end of the entrapment chamber, the entry structure having a lid defining an entry aperture and a plurality of peripheral apertures, and an attractant port fixture having (i) a tapered guide disposed below the lid, (ii) a panel structure extending through the entry aperture and having a distal end attached to the tapered guide, and a proximal end attached to a cap portion, and (iii) a plurality of tubular ports that each extend through a corresponding one of the plurality of peripheral apertures; and a plurality of cartridges, each cartridge defining an interior volume and configured to be slidably inserted into a corresponding one of the plurality of tubular ports to fluidly expose the interior volume to the entrapment chamber.

15. The insect trap of claim 14, wherein the attractant port fixture is movable between a closed position wherein the cap portion overlies the entry aperture, and an open position wherein the cap portion is disposed away from the entry aperture.

16. The insect trap of claim 14, wherein the plurality of tubular ports each have a distal end defining a cage structure that is configured to prevent target insects in the entrapment chamber from entering the tubular port.

17. The insect trap of claim 14, wherein the plurality of cartridges each have a proximal end comprising an oversized end cap.

18. The insect trap of claim 17, wherein the cap portion defines a plurality of recesses that are shaped to receive the oversized end caps of the plurality of cartridges.

19. The insect trap of claim 14, wherein the plurality of cartridges each comprise a tubular portion and a removable end cap portion that is configured to be removably attached to a distal end of the tubular portion prior to use, and to be removably attached to a proximal end of the tubular portion during use.

20. The insect trap of claim 15, wherein the panel structure slidably engages the entry aperture such that the entry aperture is partitioned into a plurality of smaller entryways, such that the smaller entryways are visually shielded from each other by the panel structure.

21. The insect trap of claim 15, wherein the entrapment chamber has an open second end, and further comprising a second entry structure that is attached to the open second end.

22. The insect trap of claim 21, wherein the entrapment chamber further comprising an internal transverse wall that divides the entrapment chamber into two separate compartments.

* * * * *